United States Patent [19]
Leith

[11] Patent Number: 5,339,854
[45] Date of Patent: Aug. 23, 1994

[54] CONSERVATION SYSTEM AND METHOD

[76] Inventor: Charles D. Leith, 8011 N. 7th St., Apt. 2135, Phoenix, Ariz. 85020

[21] Appl. No.: 95,895

[22] Filed: Jul. 19, 1993

[51] Int. Cl.$^5$ .............................................. G05D 11/13
[52] U.S. Cl. .................................. 137/2; 137/101.25; 137/412; 137/414; 261/110
[58] Field of Search .......... 137/2, 101.25, 391, 137/412, 414; 261/110

[56] References Cited

U.S. PATENT DOCUMENTS

| | | | |
|---|---|---|---|
| 3,788,340 | 1/1974 | O'Leary | 137/101.25 X |
| 4,464,315 | 8/1984 | O'Leary | 261/110 |
| 4,836,239 | 6/1989 | Kinkead | 137/413 |

*Primary Examiner*—Robert G. Nilson
*Attorney, Agent, or Firm*—Don J. Flickinger; Robert A. Parsons; Jordan M. Meschkow

[57] ABSTRACT

An apparatus for conserving utilities including coolant, in a system having an evaporative cooler equipped with a water reservoir for holding a predetermined amount of cooling water and also equipped with a recirculating system for recirculating the cooling water. The apparatus has a level sensing assembly coupled to the water reservoir. The level sensing assembly provides a first signal when the cooling water level is less than a first predetermined limit. The system has a controller coupled to the level sensing assembly for receiving the first signal. The system also has a supply valve coupled to the water reservoir, to a water supply and to the controller. The supply valve is responsive to signals from the controller. The supply valve delivers water from the water supply to the water reservoir. The system further has a bleed valve coupled to the water reservoir and to the controller. The bleed valve is responsive to signals from the controller. The bleed valve releases an amount of water from the reservoir. The system desirably has an automated dispenser of chemical additives coupled to the water reservoir and to the controller. The automated dispenser is also responsive to signals from the controller. The automated dispenser automatically provides chemical additives to the water reservoir.

29 Claims, 5 Drawing Sheets

SUPPLY    BLEED

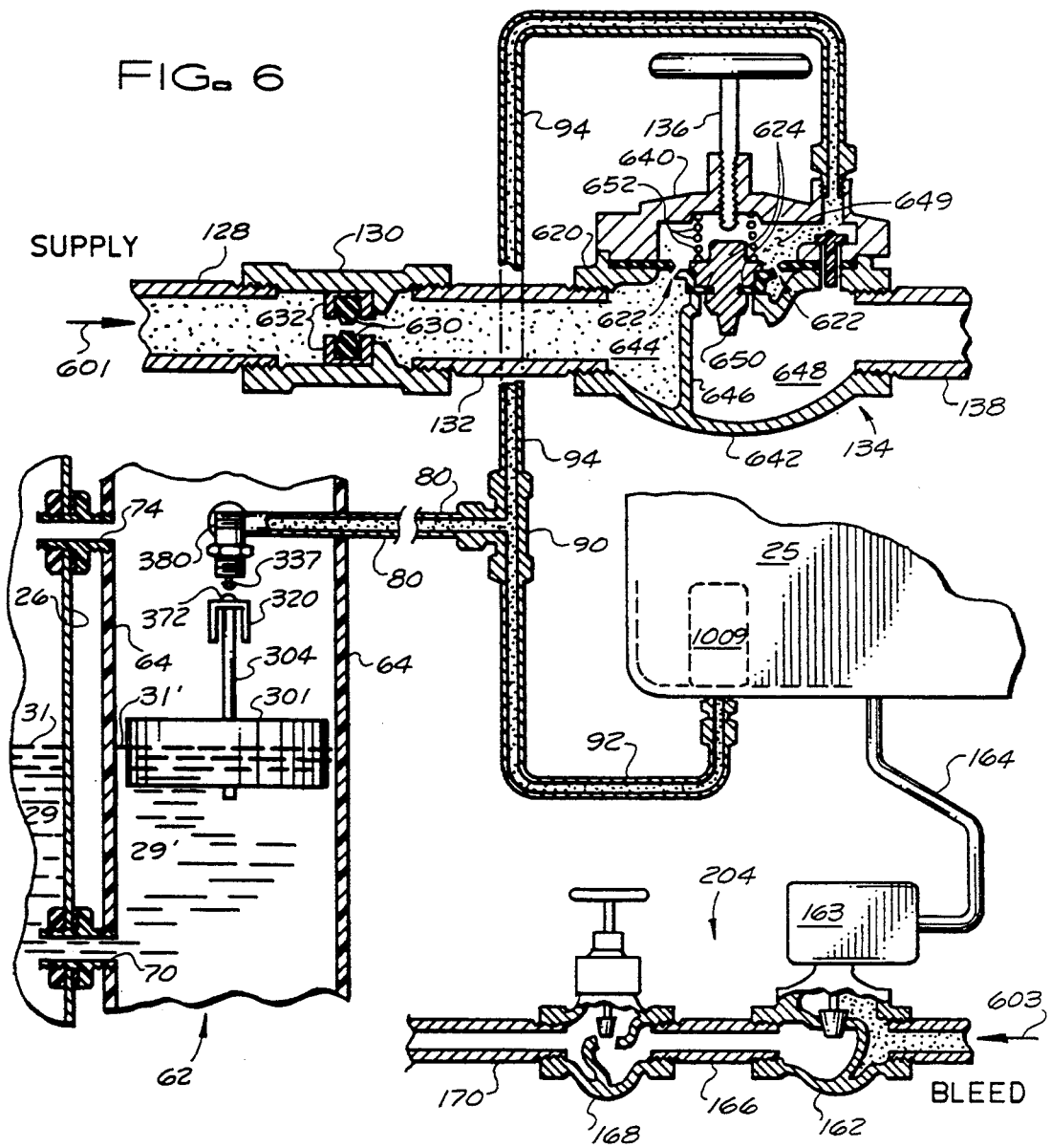
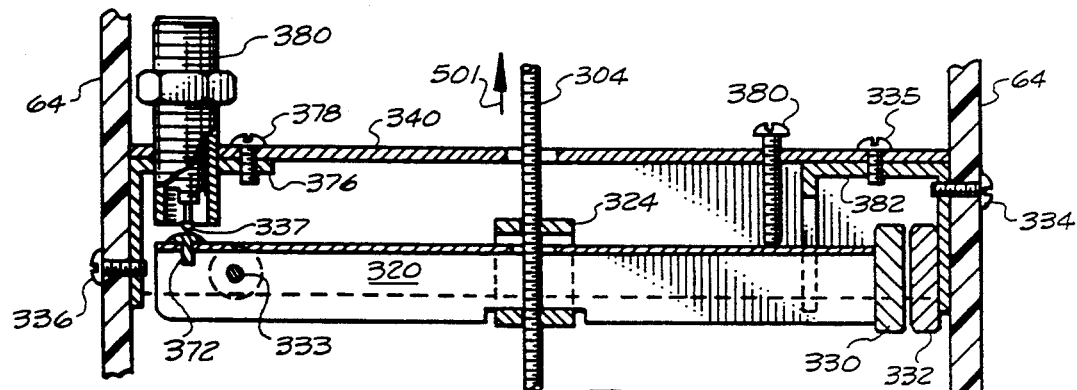

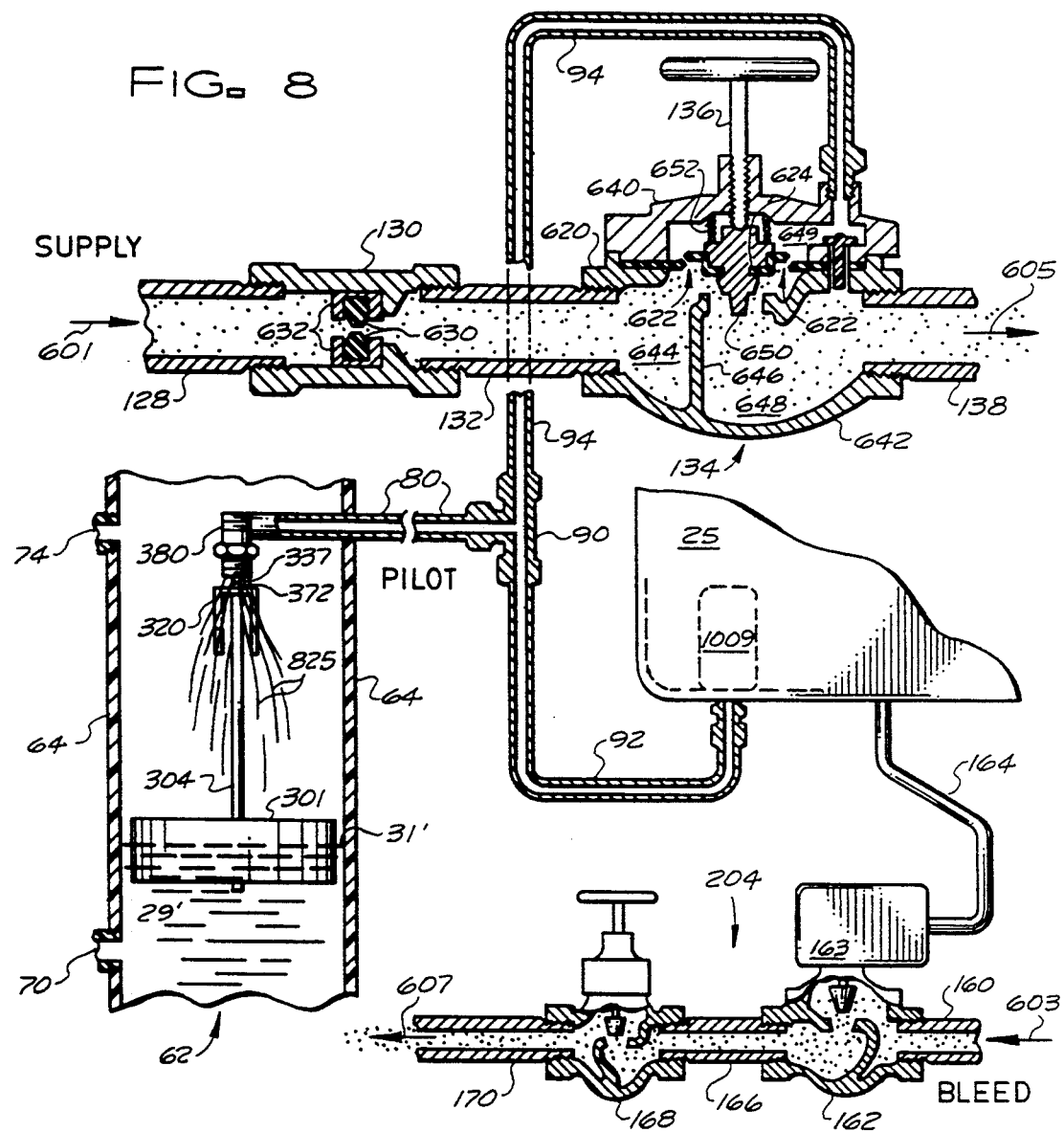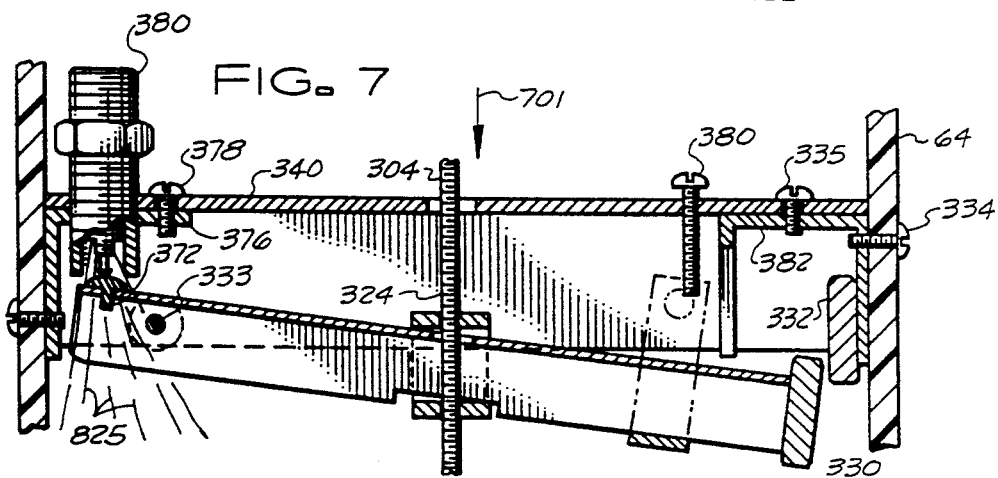

CONSERVATION SYSTEM AND METHOD

BACKGROUND OF THE INVENTION

1. Field of the Invention

This invention relates to utilities conservation and replenishment in evaporative apparatus.

More particularly, the present invention relates to conservation in cooling towers and similar apparatus requiring coolant replenishment and treatment.

In a further and more specific aspect, the instant invention concerns a method and apparatus for conservation of materials and energy relating to coolant or water replenishment and chemical treatment in maintaining a predetermined coolant level in reservoirs for cooling towers.

2. Prior Art

Cooling towers of great variety in construction and purpose are often employed for dissipating heat, either generated within a structure or to reduce the interior temperature below the ambient level. Examples include cooling towers, single and multistage evaporative coolers, evaporative condensers, air washers and the like. A feature common to such systems is a reservoir containing a volatile fluid such as water. The fluid is drawn from the reservoir, is subsequently applied to a heat exchanger and removes heat therefrom. At least in part, the removal of heat is effected through evaporation of the fluid, which phase change absorbs relatively large amounts of thermal energy or heat at the expense of some fraction of the fluid. This fraction is lost as vapor in the exhaust from the cooling tower.

Accordingly, it is often necessary to replenish the fluid stored in the reservoir in order to maintain operation of the cooling tower. Typically, some level sensing device is employed in order to determine when to supply replacement fluid to the reservoir and to regulate the rate or frequency with which fluid is replenished. A problem which has been encountered with such approaches is a tendency for the combination of make-up source and level sensing device to "dither" or oscillate about or near a desired equilibrium water level. Such oscillations result in frequent replenishment cycling, causing unnecessary wearing of the mechanism employed to deliver make-up fluid to the reservoir and also engendering waste of coolant fluid added to the reservoir.

Coolant towers are generally provided with water as a coolant fluid, because water is relatively inexpensive, is readily available in urban areas and has a relatively large heat of vaporization, with vaporization occurring in a useful temperature range. However, water supplied or available in many areas contains suspended and/or dissolved materials including minerals, which tend to become concentrated in cooling tower reservoirs because these materials are not carried away by the evaporative process. These materials may increase in concentration to levels where precipitation of dissolved materials and settling of suspended materials cause fouling of portions of the cooling tower apparatus, hindering operation of pumps and the like and also coating the heat exchanger and thereby reducing the efficiency of heat transfer from the coolant circulating therethrough.

Further, the level sensing apparatus employed for regulating the replenishment of fluid within the reservoir may be affected, resulting in improper operation and a failure to maintain the desired predetermined coolant level in the reservoir. This may cause overfilling and therefore waste of make-up fluid or may result in inadequate fluid levels within the reservoir, resulting in reduced cooling capacity.

Accordingly, it is desirable to dilute the body of water accumulated in the reservoir from time-to-time by adding an amount of water thereto. However, this alone is not necessarily sufficient because the concentration of impurities carried in the water and deposited in the reservoir increases as the evaporative processes continue. Therefore, it is appropriate to release or "bleed" some amount of water from the reservoir from time-to-time in order to maintain impurity concentrations within some predetermined limits. Excessive bleeding results in reduced concentration increases but raises operating costs by requiring additional water and also results in increased sewer usage with attendant costs for wastewater treatment and disposal. Inadequate bleeding results in increased impurity concentrations and attendant fouling of the heat exchanger, pumps, plumbing and level regulating assembly. Accordingly, automated bleeding in the proper amount is strongly desirable.

An additional problem often encountered in cooling towers employing water-filled reservoirs results from the fecundity which such an environment provides to a variety of simple organisms. These organisms may include algae, yeasts or fungi as well as single- or multi-celled life forms including bacteria.

Some such organisms may be pathogenic and hence extremely undesirable, particularly in cooling towers employed to provide cool air to structures containing large numbers of people, such as hospitals, hotels, airports, shopping malls, stores, restaurants and other public and private institutions. Legionella, for example, is an organism known to reproduce readily in a cooling tower environment and capable of providing deadly airborne disease when present in such an environment. Another example of airborne disease readily spread by building ventilation is tuberculosis.

A further problem is that algae or fungi, if present in sufficient numbers, may cause fouling of pumping apparatus, level sensing apparatus or heat exchanging apparatus. Such fouling gives rise to attendant undesirable effects as noted with respect to mineral deposits.

In order to combat these varied problems, some form of biocide or chemical inhibitor is often added to the water in the reservoir. Such additives tend to become concentrated in the reservoir in a fashion analogous to that of waterborne minerals and may result in similar unwanted and undesirable effects for much the same reasons. Additionally, the biocide or chemical inhibitor constitutes an added expense associated with maintaining and operating cooling towers. It is extremely desirable to regulate the addition of such materials in order to maintain a useful concentration thereof, thus inhibiting unwanted proliferation of undesirable or damaging micro-organisms, while avoiding unnecessarily high concentrations and the attendant problems and expenses associated therewith.

The prior art has also provided variations of the above described apparatus for cooling towers.

While the various mentioned prior art devices function as apparatus for supplying additional fluid to cooling tower reservoirs, certain inherent deficiencies preclude adequate, satisfactory performance for the purpose of reducing operating expenses and conserving materials and energy required for normal operation.

It would be highly advantageous, therefore, to remedy the foregoing and other deficiencies inherent in the prior art.

Accordingly, it is an object of the present invention to provide improvements in cooling tower operation.

Another object of the present invention is the provision of an improved control system for regulating supply of make-up water to cooling tower reservoirs.

And another object of the present invention is to provide an improved control system for regulating bleeding of stored water from cooling tower reservoirs.

Still another object of the present invention is the provision of a method for conserving supplies while maintaining operating conditions for cooling tower reservoirs.

Yet another object of the instant invention is to provide a method for conserving water in cooling tower heat exchanging apparatus.

Yet still another object of the instant invention is the provision of a method for regulating bleed rate in coordination with supplying make-up water in heat exchanging devices.

And a further object of the invention is to provide a method for coordinating biocide addition to cooling tower reservoirs.

Still a further object of the immediate invention is the provision of a control system for controlling addition of make-up water and also chemical additives to aqueous reservoirs for heat exchanging applications.

Yet a further object of the invention is to provide a control system and method for conservation of make-up water in reservoirs of cooling towers by regulation of both influx and exhaust rates for coolants employed therein.

And still a further object of the invention is the provision of method and apparatus, according to the foregoing, which is intended to maintain predetermined levels of coolant in a reservoir while reducing deposition of mineral materials, inhibiting micro-organism reproduction and simultaneously conserving supplies.

SUMMARY OF THE INVENTION

Briefly, to achieve the desired objects of the instant invention in accordance with a preferred embodiment thereof, provided is a method for conservation of utilities and supplies in operation of cooling towers. In cooling towers having an evaporative cooler including a water reservoir for holding a predetermined amount of cooling water and a recirculating system for recirculating same, including a pump having an inlet coupled to the water reservoir and an outlet coupled to a spraying device, where the spraying device directs cooling water to a heat exchange unit and supplies cooling water thereto, and where a water reservoir is equipped with a level sensing assembly for providing a first signal to a controller when the cooling water level is less than a first predetermined limit and wherein the water reservoir is coupled to a water supply via a supply valve responsive to signals from the controller and the water reservoir is equipped with a bleed valve responsive to signals from the controller and further wherein an automated dispenser of chemical additives responsive to signals from the controller is coupled to the water reservoir, a method for coordinating regulation operation of a supply valve, a bleed valve and an automated dispenser is provided.

The method includes sending the first signal from the level sensing assembly when the cooling water level is less than the first predetermined limit and providing a first control signal from the controller in response to the first signal. The method also includes opening the bleed valve to bleed water from the reservoir in response to the first control signal, providing a second control signal and opening the supply valve to supply water to the reservoir in response to the second control signal. The method further includes providing a third control signal from the controller in response to the first signal and dispensing additives to the water reservoir in response to the third control signal.

Also provided is an apparatus for conserving utilities including coolant, in a system having an evaporative cooler equipped with a water reservoir for holding a predetermined amount of cooling water. The system is also equipped with a recirculating system for recirculating the cooling water. The apparatus has a level sensing assembly coupled to the water reservoir. The level sensing assembly provides a first signal when the cooling water level is less than a first predetermined limit.

The system has a controller coupled to the level sensing assembly for receiving the first signal. The system also has a supply valve which is responsive to signals from the controller. The supply valve is coupled to the water reservoir, to a water supply and to the controller. The supply valve delivers water from the water supply to the water reservoir in response to the first signal. The system further has a bleed valve which is responsive to signals from the controller. The bleed valve is coupled to the water reservoir and to the controller. The bleed valve releases an amount of water from the reservoir in response to the first signal.

The system desirably but not essentially has an automated dispenser of chemical additives which is also responsive to signals from the controller. The automated dispenser of chemical additives is coupled to the water reservoir and to the controller. The automated dispenser automatically provides chemical additives to the water reservoir in response to the first signal.

Also contemplated by the instant invention is a conservation apparatus for conserving utilities in an evaporative cooler having a water reservoir for holding a predetermined amount of cooling water. The apparatus includes a recirculating system for recirculating the cooling water and a level sensor coupled to the water reservoir. The level sensor provides a first signal "FILL" when a first level of the cooling water is less than a first predetermined limit and also provides a second signal "FULL" when the cooling water level exceeds a second predetermined limit. The apparatus also includes a controller which receives the first and second signals. The controller is coupled to the level sensor.

The apparatus further includes a supply valve coupled to the water reservoir, to a water supply and to the controller. The supply valve is responsive to the first and second signals from the controller. The supply valve delivers water from the water supply to the water reservoir. specifically, the supply valve opens and delivers water from the water supply to the water reservoir when the level sensor sends the first signal "FILL" and the supply valve ceases delivering water from the water supply to the water reservoir when the level sensor sends the second signal "FULL".

As well, the apparatus includes a bleed valve coupled to the water reservoir and to the controller. The bleed valve is responsive to the first and second signals from the controller. The bleed valve releases an amount of water from the reservoir. Specifically, the bleed valve opens and releases water from the reservoir when the level sensor sends the first signal "FILL" and the bleed valve closes and ceases releasing water from the reservoir when the level sensor sends the second signal "FULL".

In a preferred embodiment, the conservation apparatus includes an automated dispenser of chemical additives coupled to the water reservoir and to the controller. The automated dispenser is responsive to the first and second signals from the controller. The automated dispenser automatically provides chemical additives to the water reservoir. Specifically, the automated dispenser dispenses additives to the water reservoir when the level sensor sends the first signal "FILL" and the automated dispenser ceases dispensing additives to the water reservoir when the level sensor sends the second signal "FULL".

A method is also contemplated in the present invention for coordinating regulation and operation of a supply valve and a bleed valve. The method includes steps of sending a first signal from a level sensing assembly when a cooling water level in a reservoir is less than a first predetermined limit, receiving the first signal by a controller and providing a first control signal from the controller in response to the first signal. The method further includes steps of opening the bleed valve to bleed water from the reservoir in response to the first control signal, providing a second control signal from the controller in response to the first signal and opening the supply valve to supply water to the reservoir in response to the second control signal.

The method desirably but not essentially includes steps of providing a third control signal from the controller in response to the first signal and dispensing additives from an automated dispenser to said water reservoir in response to said third control signal.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 5 a further enlarged side view, in section, of the hydraulic valve and related components of the level sensing assembly of FIGS. 1 through 4, illustrating a first steady state position of the level sensing assembly elements;

FIG. 6 is a further enlarged side view, in section, of the supply valve, bleed valving assembly, level sensing assembly, control panel and a portion of the coolant tower of the cooling tower and conservation system of FIG. 1, illustrating the first steady state position of the level sensing assembly elements;

FIG. 7 is a further enlarged side view, in section, of the hydraulic signal generating valve and related components of the level sensing assembly of FIGS. 1 through 6, illustrating a second steady state position of the level sensing assembly elements;

FIG. 8 is a side view, in section, of the supply valve, bleed valving assembly, control panel and interconnections and a portion of the level sensing assembly of FIGS. 1 through 7, illustrating a second steady state position of the level sensing assembly elements;

DETAILED DESCRIPTION OF THE PREFERRED EMBODIMENT

Figure 1:
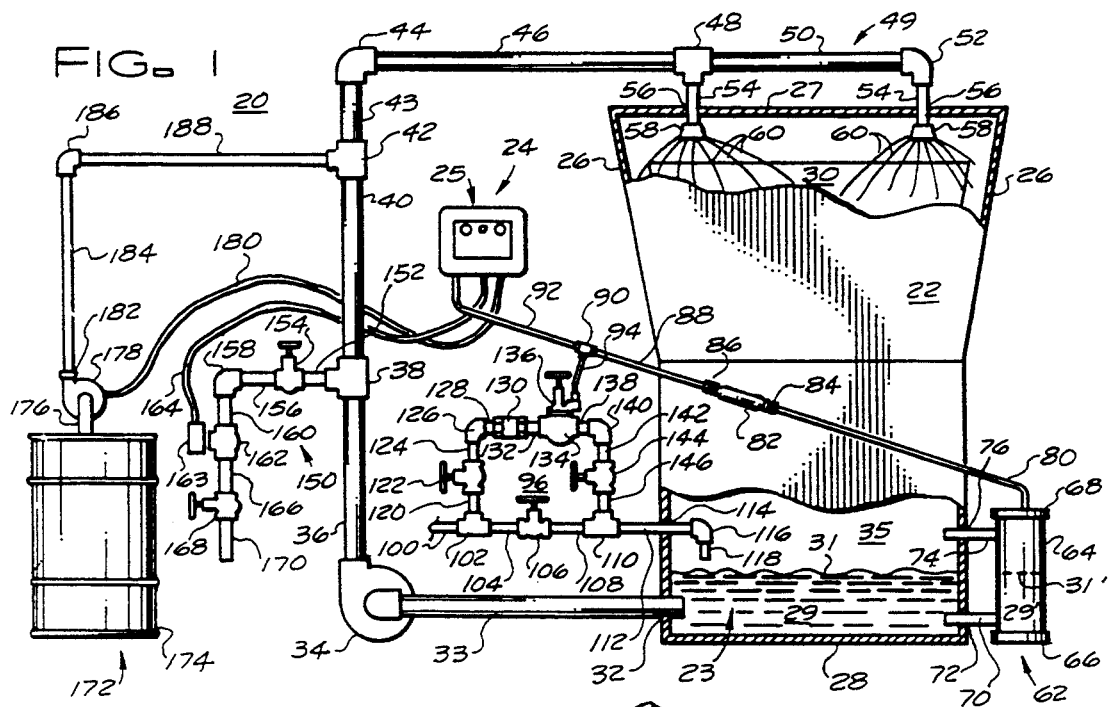
FIG. 1 is a schematic illustration of a conventional cooling tower system provided with a conservation system in accordance with the teachings of the instant invention.

Turning now to the drawings, in which like reference characters indicate corresponding elements throughout the several views, attention is first directed to FIG. 1 which illustrates conventional water cooling tower 22 provided with conservation system 24 in accordance with the teachings of the instant invention and generally designated by the reference character 20. In accordance with the configuration chosen for purposes of illustration, water cooling tower 22 includes water collecting basin or reservoir 23, side walls 26, top 27, closed bottom 28 and contains heat exchanger 30. Basin or reservoir 23 holds and stores water 29 having water level 31, above which air space 35 exists. Water level 31 is referred to herein as the predetermined desired water level.

Water cooling tower 22 includes a water circulation system for recirculating water 29. Water 29 is drawn through side wall 26, for example, through pipe 33 extending through opening 32 through side wall 26. Opening 32 has inlet pipe 33 sealed thereto. Inlet pipe 33 is coupled to an inlet of pump 34 and water 29 is drawn through inlet pipe 33 by pump 34. Pump 34 impels water 29 through pipe 36 coupled to an outlet of pump 34 and then successively through tee joint 38 coupled to one end of pipe 40, another end of which is in turn connected to tee joint 42. Tee joint 42 also joins one end of pipe 43, which is in turn coupled to elbow joint 44. Elbow joint 44 joins a first end of pipe 46. Pipe 46 has a second end which is coupled to sprayer system 49 atop heat exchanger 30.

Sprayer system 49, as illustrated in FIG. 1, includes tee joint 48, a first member of which is coupled to a first end of pipe 50 and a second member of which is coupled to the second end of pipe 46. A second end of pipe 50 joins one side of elbow joint 52. The other side of elbow joint 52 and a third member of tee joint 48 are each coupled separately to pipes 54. Pipes 54 each extend through openings 56 in top 27 of cooling tower 22. Pipes 54 provide water 29 pumped by pump 34 to spray heads 58. Spray heads 58 emit stream, spray or mist 60 of recirculating water generally directed towards heat exchanger 30. This arrangement provides a continuous stream 60 of recirculated water to heat exchanger 30 for cooling heat exchanger 30. It will be appreciated that other arrangements for recirculating water 29 may be employed and that any conventional heat exchanger may be employed for heat exchanger 30.

Conservation system 24 coupled to cooling tower 22 includes control panel 25 coupled to level sensing assembly 62, water supply assembly 96, bleed valving assembly 150 and chemical dispensing unit 172. Control panel 25 coordinates operation of these assemblies and unit to provide the advantages and features of the present invention.

Level sensing assembly 62 determines when water level 31' varies from predetermined desired water level 31 and particularly determines when water level 31' falls below predetermined desired water level 31. Level sensing assembly 62 desirably has cylindrical walls 64 forming an upright cylinder having an axis thereof (not shown in FIG. 1) aligned in a vertical direction. Level sensing assembly 62 further has sealed bottom 66 and top 68, forming a still well, and includes water inlet conduit 70 and equalization conduit 74.

Water inlet conduit 70 passes through and is sealed to aperture 72 in side wall 26, while equalization conduit 74 passes through and is desirably sealed to aperture 76 in side wall 26. Aperture 72 is below predetermined desired water level 31 and is preferably about six inches below predetermined desired water level 31, while aperture 76 is above predetermined desired water level 31 and preferably is about eight inches above predetermined desired water level 31. Water inlet conduit 70 and equalization conduit 76 together allow water 29' to equilibrate with water 29 in basin 23, thus causing water level 31' to approximate closely predetermined desired water level 31 of water 29 in basin 23.

Level sensing assembly 62 is also coupled to conduit 80 extending from top 68 to filter assembly 82. Filter assembly 82 and conduit 80 are joined at one end of filter assembly 82 by fitting 84. Filter assembly 82 desirably includes a fine wire mesh screen and acts to prevent silt or other impurities from being carried to level sensing assembly 62. Filter assembly 82 is coupled at another end by fitting 86 to a first end of conduit 88. Conduit 88 has a second end coupled to a first member of tee joint 90. Tee joint 90 has a second member coupled to conduit 92 and a third member coupled to conduit 94. In a preferred embodiment of the present invention, conduits 80, 88, 92 and 94 are desirably realized as suitable lengths of one-fourth inch outside diameter copper tubing.

In operation, level sensing assembly 62 generates a digital ("on-off") hydraulic signal when water level 31' deviates from predetermined desired water level 31, particularly when water level 31' falls below predetermined desired water level 31. The hydraulic digital signal is transmitted via conduits 80 and 88 and is coupled to control panel 25 and to water supply assembly 96 via conduits 92 and 94, respectively.

It will be appreciated that, while level sensing assembly 62 is illustrated as having hydraulic couplings to control panel 25 and water supply assembly 96, level sensing assembly 62 may comprise an electronic level sensing assembly coupled to top 68 or to the top of cylindrical wall 64, or, alternatively, mounted within cooling tower 22. In this embodiment, conduits 80, 88, 92 and 94 are replaced by electrical interconnections from level sensing assembly 62 to control panel 25 and/or water supply assembly 96. Electronic level sensing assemblies suitable for this purpose include "KOTRON ™" RF capacitance probes and the like, available from Magnatrol, for example. Such probes may usefully be probes employing ultrasonic, electromagnetic or optical level detection schemes, for example, and are manufactured in a wide variety of configurations for differing applications.

Water supply assembly 96 includes inlet pipe 100 having a first end (not illustrated in FIG. 1) coupled to a water supply (not illustrated) and having a second end joined to a first member of tee joint 102. Tee joint 102 has a second member coupled to a first end of pipe 104. A second end of pipe 104 is coupled to an inlet to manual supply valve 106. Manual supply valve 106 has an outlet coupled to a first end of pipe 108. Pipe 108 has a second end coupled to a first member of tee joint 110, which, in turn, has a second member coupled to pipe 112, elbow joint 116 and optional pipe 118. Basin 23 may thus be manually filled with water 29 to a desired level (e.g., predetermined desired water level 31 ) by hand operation of manual supply valve 106.

Tee joint 102 also has a third member coupled to pipe 120 joining tee joint 102 to an inlet of manual valve 122. An outlet of manual valve 122 is coupled in turn via pipe 124, elbow 126 and pipe 128 to an inlet of flow rate regulator 130. Flow rate regulator 130 has an outlet coupled to an inlet of hydraulically operated valve 134 via pipe 132. An outlet of hydraulically operated valve 134 in turn is coupled to a first end of pipe 138. A second end of pipe 138 is coupled to a first member of elbow joint 140. A second member of elbow joint 140 is coupled to a first end of pipe 142. A second end of pipe 142 is coupled to manual valve 144. Manual valve 144 is coupled to a first end of pipe 146. A second end of pipe 146 is coupled to a third member of tee joint 110. Hydraulically operated valve 134 is shown as having manual handle 136 allowing manual operation or verification of operability (i.e., permitting a user to determine presence of water) and is also coupled to conduit 94 for receiving digital hydraulic signals from level sensing assembly 62. Manual valves 122 and 144 enable ready service of hydraulically operated valve 134 or flow regulator 130 without necessitating interruption of water supply to other apparatus.

When level sensing assembly 62 detects that water level 31' has fallen below a predetermined lower limit, a first digital hydraulic signal (e.g., "FILL") is coupled via conduits 80, 88, 92 and 94 to hydraulically operated valve 134 which admits water from a water source (not illustrated) through pipe 100 and delivers the water via pipe 118 to basin 23. Similarly, when level sensing assembly 62 detects that water level 31' has risen above a predetermined upper limit, a second digital hydraulic signal (e.g., "FULL") is coupled as before to hydraulically operated valve 134, stopping admission of water from the water source by hydraulically operated valve 134 and ceasing to fill basin 23.

It will be appreciated that while hydraulic couplings are illustrated in FIG. 1 to hydraulically operated valve 134, valve 134 may be an electrically operated valve such as the dependable packless Type "A" full port, normally closed solenoid valve, available from Magnatrol Valve Corp. of Hawthorne, NJ. In this embodiment, conduit 94 is replaced by electrical interconnections between valve 134 and control panel 25 and/or conduits 80, 88 and 92 are replaced by electrical interconnections to level sensing assembly 62. Electrical signals may be generated, for example, by control panel 25 in response to hydraulic or electrical signals from level sensing assembly 62 as later described.

Bleed valving assembly 150 includes pipe 152 having a first end coupled to a third member of tee joint 38 and a second end coupled to manual valve 154. Manual valve 154 is coupled in turn via pipe 156, elbow joint 158 and pipe 160 to bleed valve 162. Bleed valve 162 has solenoid 163 coupled via electrical interconnection 164 to control panel 25. Bleed valve 162 in turn is coupled via pipe 166 to manual valve 168 and thence to drain pipe 170. Drain pipe 170 may be coupled to any appropriate drain or sewer providing appropriate chemical treatment for waste water drained thereby. Manual valves 154 and 168 are normally employed to regulate drainage flow of water through bleed valving assembly 150 to provide an appropriate ratio, for example, between bleed rate through bleed valving assembly 150 and inlet water rate supplied via water supply assembly 96.

Bleed valve 162 is preferably an electrically operated solenoid type valve and operates in response to control signals from control panel 25 coupled via electrical interconnection 164 to solenoid 163. Bleed valve 162 is preferably a normally closed valve, avoiding possibility of accidental drainage of basin 23 during temporary power outages.

Chemical dispensing unit 172 includes chemical reservoir 174 having an inlet of pump 178 coupled to feed pipe 176 extending into chemicals stored in chemical reservoir 174. Pump 178 has outlet 182 coupled to a first end of pipe 184. A second end of pipe 184 is coupled to a first member of elbow joint 186. A second member of elbow joint 186 is coupled to a first end of pipe 188. A second end of pipe 188 is coupled to a third member of tee joint 42. Pump 178 impels chemicals such as biocides from chemical reservoir 178 into pipe 184 coupled to outlet 182 of pump 178 and thence via elbow joint 186, pipe 188 and the third member of tee joint 42 into the circulating water of cooling tower 22. Pump 178 has electrical interconnection 180 to control panel 25 and operates in response to electrical signals coupled from control panel 25.

Conservation system 24 is thus able to supply make-up water to basin 23, to bleed waste water from basin 23 when water is circulating through cooling tower 22 and is also able to regulate addition of chemical additives to water contained in cooling tower 22 under automatic control. Proper adjustment of the rates of these processes provides economical and automatic maintenance of appropriate operating conditions for cooling tower 22.

Figure 2:
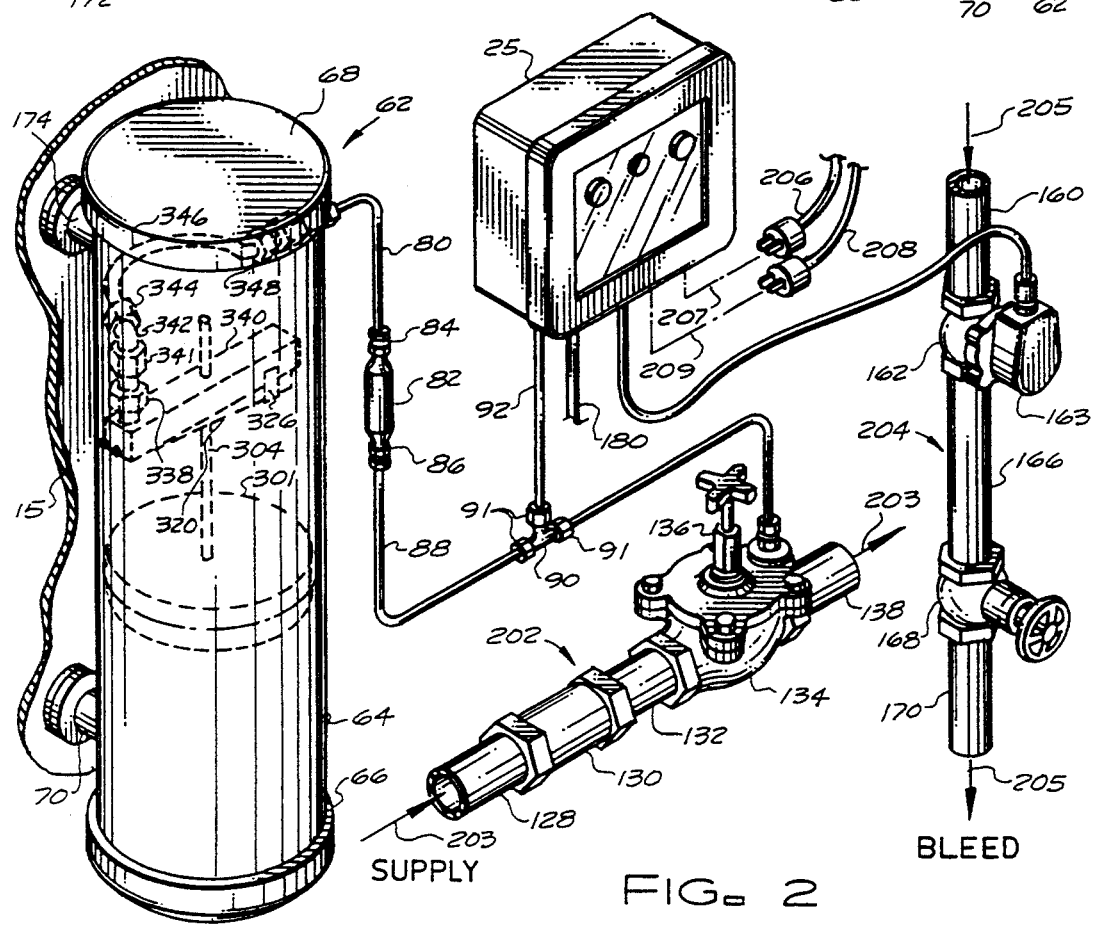
FIG. 2 is an enlarged detailed view of a level sensing assembly, control panel, supply valve assembly, bleed valving assembly and interconnections therebetween of the conservation system of FIG. 1.

Referring now to FIG. 2, an enlarged detailed view of level sensing assembly 62, control panel 25, supply valve assembly portion 202 and direction arrows 203 showing direction of water flow, bleed valving assembly portion 204 and direction arrows 205 showing direction of waste water flow is shown. Also shown are interconnections between these elements of conservation system 24 of FIG. 1.

Flow regulator 130 of supply valve assembly portion 202 is usefully a restrictor type flow regulator and desirably is a restrictor incorporating a flexible flow restriction element such as the Type G-series flow regulator available from Dole, for example.

The latter flow regulators maintain a constant throughput of a specified number gallons per minute over a broad range of pressure differentials across the flow regulator. Also shown in FIG. 2 are line cords 206 and 208 which may be engaged in outlets (not shown in FIG. 2) on control panel 25 whose positions are indicated by dashed lines 207 and 209. Line cords 206 and/or 208 may correspond, for example, to pump(s) 178. Placement of outlets for portions (e.g., pump 178) of conservation system 24 on control panel 25 provides advantages of safety in servicing conservation system 24 and convenience in set-up and operation.

Manual valve 168 and manual valves 154, 106, 122 and 144 of FIG. 1 are usefully realized as bronze gate valves or brass ball valves manufactured by Speedaire and readily available through plumbing suppliers. Bronze and brass valves provide the advantages of corrosion resistance and reliable operation. Bleed valve 162 is desirably a brass diaphragm valve selected to provide operation in water systems from zero to over 120 pounds per square inch of water pressure.

Also indicated by dashes lines within level sensing assembly 62 are float assembly 301, threaded rod 304, lever 320, bracket 326, support 340, hydraulic valve 338, coupling 341, pipe 342, coupling 344, pipe 346 and coupling 348, which, along with a first preferred embodiment of level sensing assembly 62 are described in greater detail in connection with FIGS. 3 through 8 below.

Figure 3:
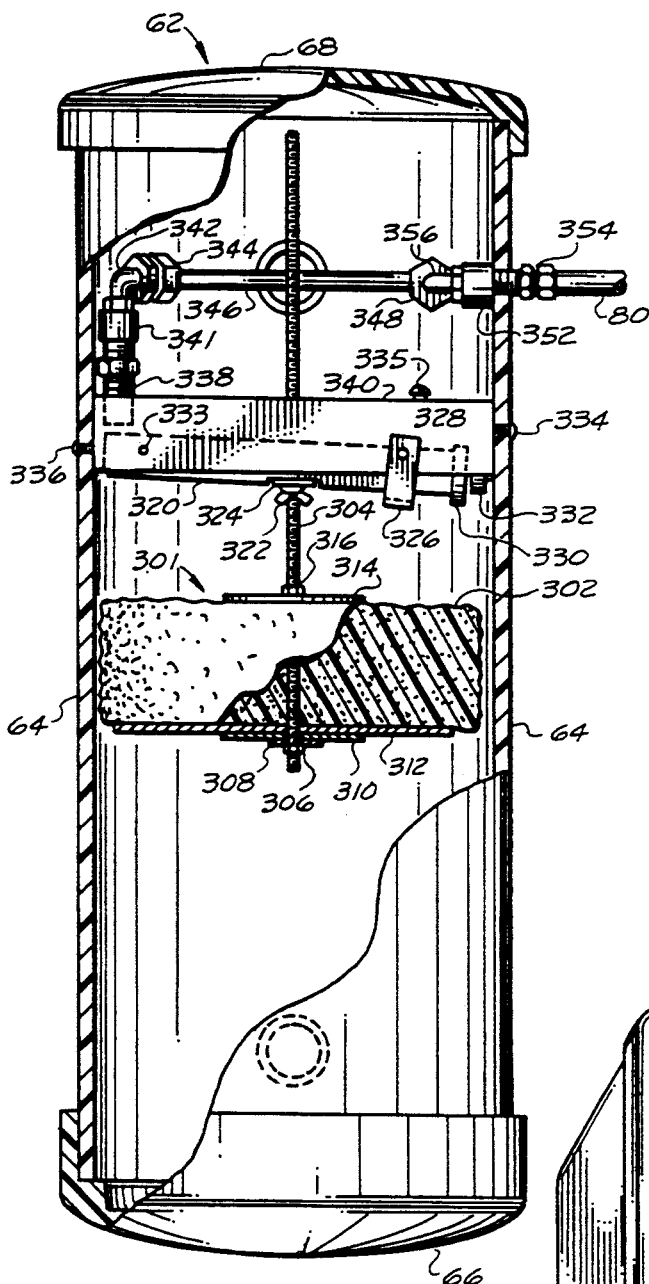
FIG. 3 is a further enlarged side view, in partial section, of a first preferred embodiment of the level sensing assembly of FIGS. 1 and 2.

Reference is now made to FIG. 3, a further enlarged side view, in partial section, of a first preferred embodiment of level sensing assembly 62 of FIGS. 1 and 2. Level sensing assembly 62 contains float assembly 301 within substantially hollow cylindrical housing 64.

Float assembly 301 includes float 302, shown in partial cross-section in FIG. 3, supported beneath and affixed to threaded rod 304 at a lower end thereof by nut 306. Nut 306 is threadedly engaged with threaded rod 304 and holds supporting washer 308, large washer 310 and weight 312 in place below float 302, supporting float 302 and affixing float 302 to rod 304.

Weight 312 desirably comprises approximately six ounces of metal and preferably comprises lead. Nut 316 threadedly engaged with threaded rod 304 and large washer 314 captures float 302 from above, fixing float 302 at a desired position along the length of rod 304 which position may be adjusted by adjusting nuts 306 and 316.

Threaded rod 304 is disposed along a central axis of cylindrical walls 64 and is oriented vertically while float 302 is centrally penetrated by threaded rod 304. Threaded rod 304 is adjustably coupled to lever 320 via wing nut 322. Wing nut 322 supports bracket 324 and acts as a locking nut for adjusting the heighth of float 302. Bracket 324 is not fully visible in FIG. 3 and will be shown and discussed in more detail in connection with FIG. 4 to follow.

Adjustment of the relative separation of float 302 and lever 320 is effected both by adjustment of the position of float 302 on threaded rod 304 as described hereinabove and by adjustment of wing nut 322. This allows "fine tuning" of level sensing assembly 62 to a particular preferred desired water level 31 (see FIG. 1).

Lever 320 is pivotally secured at one end via pivot 333 and has magnet 330 disposed on a distal end of lever 320. Magnet 330 has a first magnetic pole towards the distal end of lever 320 and the other magnetic pole disposed to face magnet 332. Magnet 332 is coupled to support 340 and support 340 is attached to cylindrical wall 64 by screw 334. Screw 335 is discussed in more detail in text associated with FIG. 4 below.

Magnet 332 has a magnetic pole facing magnet 330 of the same polarity as the magnetic pole of magnet 330 facing magnet 332, i.e., if the North pole of magnet 330 is facing magnet 332, then the North pole of magnet 332 is facing magnet 330. Magnets 330 and 332 cooperate to provide a nonlinear additional force which must be overcome in moving lever 320 from a first extremal position, e.g., fully lowered, to a second extremal position, e.g., fully raised.

This additional force required to operate lever 320 avoids unnecessary oscillations or dithering of level sensing assembly 62 and provides improved operation thereof.

Support 340 is rigidly coupled to cylindrical walls 64 by screws 334 and 336, for example. Support 340 also has L-shaped bracket 326 attached thereto by screw 328. L-shaped bracket 326 operates to restrict the lower range of motion of lever 320. Support 340 also has hydraulic valve 338 coupled thereto such that the short lever arm of lever 320 operates hydraulic valve 338 in response to changes in water level 31' (not illustrated in FIG. 3; see FIG. 1) as will be discussed in greater detail in association with FIGS. 5 and 7 to follow.

Hydraulic valve 338 is coupled by coupling 341 to a first end of pipe 342. A second end of pipe 342 in turn is coupled to a first member of coupling 344. Coupling 344 has a second member coupled to a first end of pipe or conduit 346, which has a second end coupled to a first member of coupling 348. Coupling 348 has a second member coupled to a first end of pipe or conduit 350, which has a second end coupled to couplings 352 and 354 through cylindrical wall 64 to a first end of conduit 80 and thereby to water supply assembly 96 (FIG. 1) and control panel 25 (FIG. 1).

Figure 4:
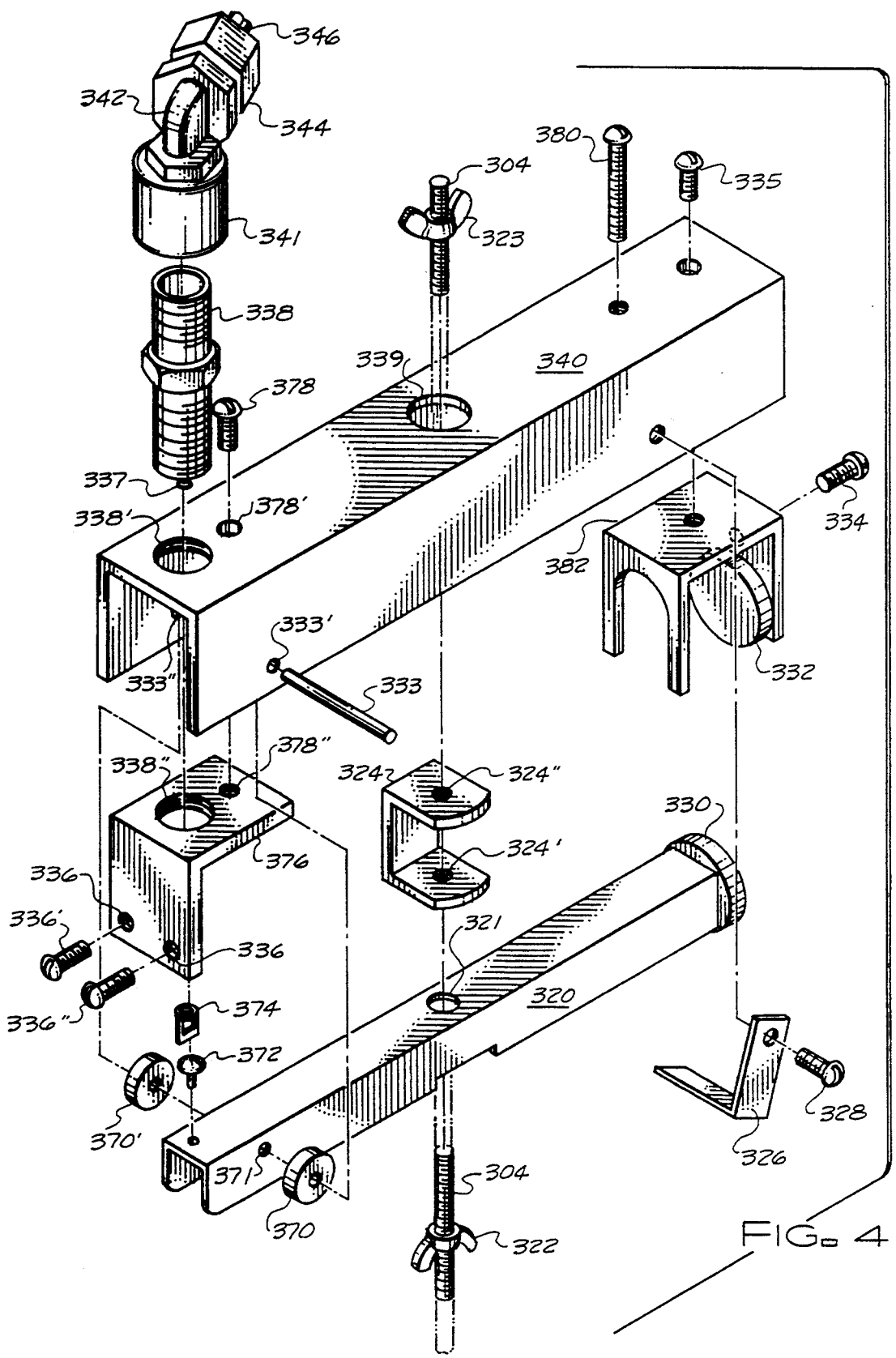
FIG. 4 is an enlarged exploded view of the lever, magnets and hydraulic valve of the first preferred embodiment of the level sensing assembly of FIGS. 1 through 3.

For further detail of the internal components of level sensing assembly 62, reference is now made to FIG. 4, providing an enlarged exploded view of lever 320, magnets 330 and 332 and hydraulic valve 338 of the first preferred embodiment of level sensing assembly 62 of FIGS. 1 through 3. Pivot 333 is seen to extend from opening 333' on a first outside edge of support 340 in turn through first bushing 370, opening 371 in lever 320, opening 371' in lever 320 (not shown in FIG. 4, corresponding to opening 371 but disposed opposing opening 371), second bushing 370' and opening 333'' on a second outside edge of support 340 opposed to the first edge and opposed to opening 333'. This arrangement allows lever 320 to pivot about pivot 333 in response to changes in position of rod 304.

Threaded rod 304 is seen to extend from beneath wing nut 322 and in turn to extend through lower opening 324' in bracket 324, through opening 321 centrally or approximately centrally located in lever 320, through upper opening 324'' in bracket 324, through opening 339 in support 340, through wing nut 323 and beyond. Wing nuts 323 and 322 are threadedly engaged with rod 304 and fix the position of rod 304 relative to bracket 324 and wing nuts 322 and 323 are tightened thereagainst. Rod 304 holds lever 320, capturing rod 304 against side-to-side motion vis-a-vis lever 320 by passing through opening 321 while bracket 324 loosely holds or captures lever 320, preventing undue vertical motion thereof relative to rod 304 (i.e., rod 304 and lever 320 are coupled and move together without jamming, sticking or binding in the course of normal motion in response to changes in level of float 302).

When rod 304 is translated vertically up or down by changes in position of float 302 in response to water level 31' for example, lever 320 must follow in accordance with the motion of rod 304 but the coupling between rod 304 and lever 320 is sufficiently loose that rod 304 is not forced into an eccentric position with respect to a central axis of cylindrical walls 64 (FIGS. 1 through 3) and thus neither rod 304 or lever 320 will bind or stick in position in the course of normal operation.

Screw 380 conveniently provides an adjustable upper stop, limiting upward motion of lever 320 and therefore rod 304. Screw 335 secures bracket 382 holding magnet 332 to support 340. Screw 334 secures bracket 382 and therefore support 340 to cylindrical wall 64 (not shown in FIG. 4; see FIGS. 1 through 3).

Screws 336' are threadedly engaged in openings 336 and secure bracket 376 to cylindrical wall 64 (not shown in FIG. 4; see FIGS. 1 through 3) while screw 378 passes through opening 378' in support 340 and is threadedly engaged with opening 378'' of bracket 376, firmly clamping support 340 with respect to cylindrical wall 64 (not shown in FIG. 4; see FIGS. 1 through 3). Hydraulic valve 338 is threadedly engaged with opening 338' in support 340 and/or opening 338'' in bracket 376.

Post or pin 372 is secured to lever 320 on a short lever arm thereof with respect to pivot 333. Pin 372 couples to and operates plunger 337 of hydraulic valve 338 in response to motion of lever 320 caused by vertical motion of float 302 (not shown in FIG. 4) as will be explained in greater detail hereinbelow in connection with FIGS. 5 and 7.

Optional extension member 374 desirably increases areal contact between post 372 and plunger 378 and may be coupled to either, promoting robustness of contact therebetween. It will be appreciated by those of skill in the art that hydraulic valve 338 may optionally be replaced by an electrical switch (not illustrated) operated by post 372. In this embodiment, conduits 80, 88, 92 and 94 are replaced by electrical interconnections from level sensing assembly 62 to control panel 25 and/or water supply assembly 96.

Reference is now made to FIGS. 5 and 6, wherein a first steady state position of the internal elements of level sensing assembly of FIGS. 1 through 4 is illustrated from several perspectives.

Turning now to FIG. 5, a further enlarged side view, in section, of hydraulic valve 338 and related components of the first preferred embodiment of level sensing assembly 62 of FIGS. 1 through 4, are illustrated in a first steady state position of the level sensing assembly elements.

FIG. 5 depicts rod 304 as being pushed in a direction indicated by direction arrow 501, for example by float 302 (not shown in FIG. 5) in response to water level 31' (see FIG. 1) exceeding the second predetermined level. Rod 304 draws lever 320 against screw 380, acting as a stop. Lever 320 has been drawn into the position illustrated despite the repulsive forces exerted between magnets 330 and 332, shown in close proximity to one another.

Pin 372, as illustrated in FIG. 5, is shown as not being in contact with plunger 337 and hydraulic valve 338 is accordingly closed. Pressure within conduit 80 (not shown in FIG. 5) is thus maintained at a high level, corresponding to a "do not supply water" or "FULL" digital hydraulic signal.

For further example, reference is now made to FIG. 6, wherein a further enlarged side view, in section, of supply valve assembly 202, bleed valving assembly 204, level sensing assembly 62 (FIGS. 1 through 5), a portion of control panel 25 and side wall 26 of coolant tower of cooling tower and conservation system 20 of FIG. 1, are depicted illustrating a first steady state position of the elements of level sensing assembly 62. Pressure switch 1009, represented in dotted outline in FIG. 6, is coupled to conduit 92 as will be explained in greater detail hereinbelow in connection with FIG. 10 to follow.

Level sensing assembly 62 has water 29' at level 31' closely approximating level 31 of water 29 contained within reservoir 23. Float 302 having threaded rod 30 centrally attached thereto and extending upward therefrom is supported at a level related to water level 31' and therefore to water level 31. Threaded rod 304 is attached to lever 320 (seen in end view in FIG. 6) having pin 372 mounted thereon.

Pin 372 is shown as being below and not in contact with plunger 337 of hydraulic valve 338, analogous to the relative positions thereof depicted in FIG. 5. As illustrated in FIG. 6, hydraulic valve 338 is closed and a high pressure corresponding to a "do not supply water" or "FULL" digital hydraulic signal is sent via conduit 80 to elements coupled thereto.

Flow regulator 130 of supply valve assembly 202 is illustrated in cross-section in FIG. 6, showing flexible flow restriction element 630 contained in holder 632 in the interior thereof. As mentioned in connection with FIG. 2, this type of flow regulator is preferred.

Also illustrated in cross-section in FIG. 6 is hydraulically operated valve 134. Hydraulically operated valve 134 comprises a series of interconnected cavities. Cavity 644, cavity 648 and cavity 649 are contained within upper housing 640, middle housing 620 and lower housing 642. Upper housing 640 and middle housing 620 capture diaphragm 624 having openings 622 therethrough.

Cavity 649 is coupled to conduit 94 and causes pressure signals coupled thereby to move plunger 650. When pressure within conduit 94 is above a predetermined level, plunger 650 is forced down by spring 652 and supply water in cavity 644 is prevented from entering cavity 648 by the combination of septum 646 and plunger 650. Supply water may enter in a direction indicated by direction arrow 601, but is prevented from progressing past hydraulically operated valve 134.

Also depicted in FIG. 6 is bleed valving assembly 204 together with direction indicating arrow 603 showing a direction in which bleed water would move if bleed valve 162 were open.

Reference is now made to FIGS. 7 and 8, wherein a second steady state position of the internal elements of level sensing assembly of FIGS. 1 through 6 is illustrated from several perspectives.

Directing attention first to FIG. 7, a further enlarged side view, in section, of hydraulic valve 338 and related components of level sensing assembly 62 of FIGS. 1 through 6, is provided illustrating a second steady state position of the elements of level sensing assembly 62.

FIG. 7 illustrates rod 304 as being pushed in a direction indicated by direction arrow 701, for example by float assembly 301 (not shown in FIG. 7; see FIG. 3) in response to water level 31' (see FIG. 1) falling below the first predetermined level. Rod 304 draws lever 320 down against bracket 326, acting as a lower stop.

Pin 372 is shown in FIG. 7 as being in contact with plunger 337 and hydraulic valve 338 is accordingly open, delivering spray of water 705. Pressure within conduit 80 (not shown in FIG. 5) is thus maintained at a low level, corresponding to a "supply water" of "FILL" digital hydraulic signal.

Turning now to FIG. 8, a side view, in section, of supply valve assembly 202, bleed valving assembly 204, a portion of control panel 25 and associated interconnections and a portion of level sensing assembly 62 of FIG. 6, is shown illustrating a second steady state position of level sensing assembly 62.

In FIG. 8, pin 372 is shown as being in contact with plunger 337 of hydraulic valve 338, having been raised to this position by upward motion of float 302 and therefore threaded rod 304 caused by a raising of level 31'. As illustrated, hydraulic valve 338 is open and is delivering stream of water 825 and a low pressure corresponding to a "supply water" or "FILL" digital hydraulic signal is sent via conduit 80 to elements coupled thereto.

Reduced water pressure within chamber 649 and against diaphragm 624 allows water to proceed from chamber 644 past septum 646 into chamber 648 and out through pipe 138 in a direction indicated by direction arrow 605. Stream 825 of water within level sensing assembly 62 is fed via conduits 80 and 94 from chamber 649. It will be appreciated by those of skill in the art that stream 825 of water has a secondary function, viz., that of diluting mineral and other contaminants within level sensing assembly 62 by delivery of fresh water via hydraulic valve 338 and thereby promoting reliable and trouble-free operation thereof.

Supply water may enter in a direction indicated by direction arrow 601 and exits in a direction indicated by direction arrow 605 to fill reservoir 23 (not shown in FIG. 8; see FIG. 1 ).

Also depicted in FIG. 8 is bleed valving assembly 204 together with direction indicating arrow 603 showing a direction in which bleed water enters bleed valving assembly 204 and a direction arrow 607 showing a direction in which bleed water exits bleed valving assembly 204 when bleed valve 162 is opened in response to electrical signals from control panel 25 delivered via electrical interconnection 164, in response to the "supply water" or "FILL" digital hydraulic signal generated by hydraulic valve 338.

Figure 9:
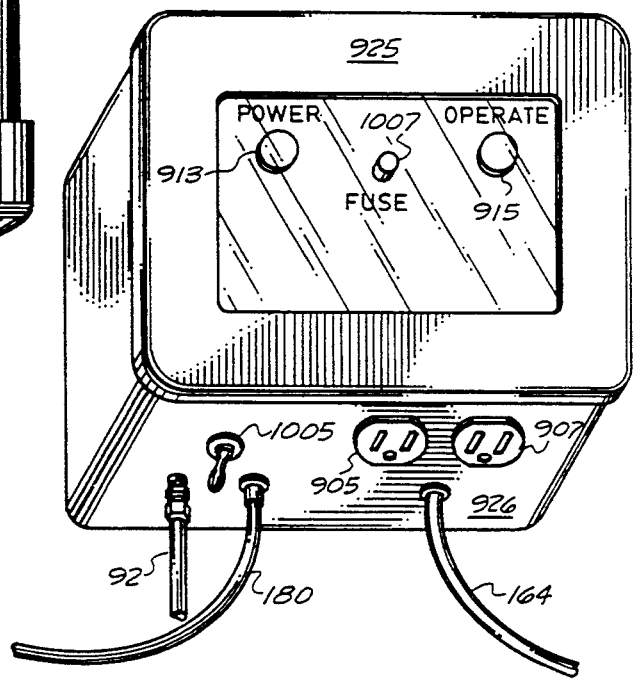
FIG. 9 is an enlarged perspective view of the control panel of FIGS. 1, 2, 6 and 8.

Attention is now drawn to FIG. 9, an enlarged perspective view of control panel 25 of FIGS. 1, 2, 6 and 8. Shown in FIG. 9 are front panel 925 having power indicator lamp 913 associated with the legend "POWER" fuse 1007 and operation indicator light 915 associated with the legend "OPERATE" the functions of which are self-explanatory. Control panel 25 is illustrated as also having lower surface 926 having power switch 1005 mounted thereon and having conduit 92, electrical interconnection 164 and electrical interconnection 180 coupled thereto (see FIGS. 1 and 2 and associated text).

Also shown as mounted on lower surface 926 are electrical outlets 905 and 907, corresponding to line cords 206 and 208 of FIG. 2, for example. It will be appreciated that other physical arrangements of these components are possible without compromise of the functionality thereof and that the specific embodiment may include, for example, more or fewer outlets such as outlets 206 and 208 and may accommodate additional functions as well.

Figure 10:
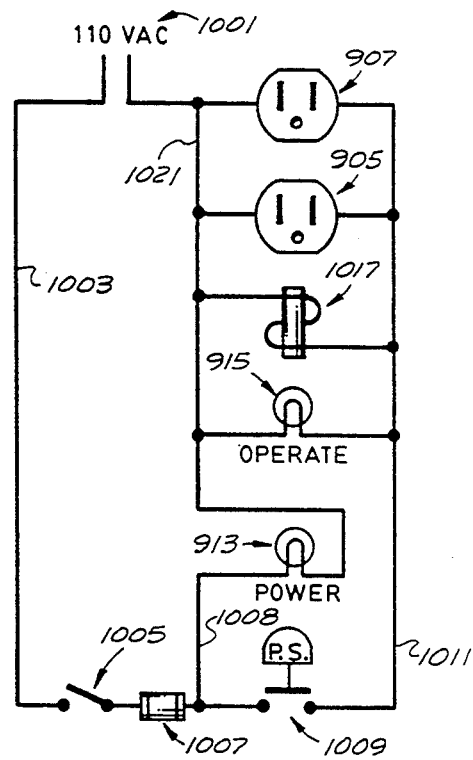
FIG. 10 is a schematic diagram of electrical interconnections pertaining to the control panel of FIGS. 1, 2, 6, 8 and 9.

Reference is now made to FIG. 10, wherein a schematic diagram of electrical interconnections pertaining to control panel 25 of FIGS. 1, 2, 6, 8 and 9 is depicted. FIG. 10 illustrates electrical power source 1001 associated with the legend "110 VAC" and having one side coupled to wire 1003. Wire 1003 is coupled to power switch 1005, which is in turn coupled in series with fuse 1007. Fuse 1007 is coupled to a side of power indicator lamp 913 associated with the legend "POWER" and to pressure switch 1009 associated with the legend "P.S. ".

Pressure switch 1009 is coupled to wire 1011, which is in turn coupled to a side each of operation indicator lamp 915 associated with the legend "OPERATE" solenoid coil 1017, outlet 905 and outlet 907. Solenoid coil 1017 corresponds, for example, to solenoid 163 of bleed valve 162 of FIGS. 1, 2, 6 and 8. Another side each of outlets 905 and 907, solenoid coil 1017, operation indicator lamp 915 and power indicator lamp 913 is coupled to wire 1021, which returns to electrical power source 1001.

When water pressure in conduit 90 decreases in response to digital hydraulic signals such as "FILL" from level sensing assembly 62, for example, pressure switch 1009 closes, supplying electrical power to operation indicator lamp 915 and to electrical outlets 905 and 907, and causing, for example, solenoid 1017 of bleed valve 162 to operate to release bleed water and causing pump 176 to dispense chemical additives.

Similarly, when water pressure in conduit 90 increases in response to digital hydraulic signals such as "FULL" from level sensing assembly 62, for example, pressure switch 1009 opens and ceases supplying electrical power to operation indicator lamp 915 and to electrical outlets 905 and 907, closing bleed valve 162 and halting pump 178.

The apparatus illustrated in FIGS. 9 and 10 thus provides safe and efficient distribution of electrical power to the associated components of control system 24 of FIG. 1. This apparatus also provides control signals for operation of control system 24 substantially as described herein and illustrated in the accompanying drawings.

The foregoing detailed description of the several embodiments of the instant invention for the purposes of explanation have been particularly directed toward the application as conservation of utilities for cooling towers, for example, for air conditioning of large buildings. It will be appreciated that the invention is equally useful for air washing apparatus and other devices where a reservoir of cooling fluid is maintained and coolant is recirculated therefrom.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a system comprising an evaporative cooler having a water reservoir for holding a predetermined amount of cooling water and a recirculating system for recirculating said cooling water, wherein said recirculating system includes a pump having an inlet coupled to said water reservoir and an outlet coupled to a spraying device, said spraying device directing said cooling water to a heat exchange unit and supplying cooling water thereto, wherein said water reservoir is equipped with a level sensing assembly coupled to a controller for providing a first signal thereto when a level of said cooling water is less than a first predetermined limit, wherein said water reservoir is coupled to a water supply via a supply valve, said supply valve operating in response to signals from said controller, wherein said water reservoir is equipped with a bleed valve operating in response to signals from said controller, and wherein an automated dispenser of chemical additives is coupled to said water reservoir, said automated dispenser operating in response to signals from said controller, a method for coordinating regulation and operation of said supply valve, said bleed valve and said automated dispenser, said method comprising steps of:

sending said first signal from said level sensing assembly when said cooling water level is less than said first predetermined limit;

receiving said first signal by said controller;

providing a first control signal from said controller in response to said first signal;

opening said bleed valve to bleed water from said reservoir in response to said first control signal;

providing a second control signal from said controller in response to said first signal;

opening said supply valve to supply water to said reservoir in response to said second control signal;

providing a third control signal from said controller in response to said first signal; and dispensing additives to said water reservoir in response to said third control signal.

2. The method as claimed in claim 1, wherein there is further included a step of sending a second signal from said level sensing assembly when said level of said cooling water exceeds a second predetermined limit.

3. The method as claimed in claim 2, wherein said step of sending a second signal includes steps of:

receiving said second signal by said controller;

providing a fourth control signal from said controller in response to said second signal; and closing said bleed valve to cease bleeding water from said reservoir in response to said fourth control signal.

4. The method as claimed in claim 3, wherein said step of sending a second signal includes steps of:

providing a fifth control signal by said controller in response to said second signal; and closing said supply valve to cease supplying water to said reservoir in response to said fifth control signal.

5. The method as claimed in claim 4, wherein said step of sending a second signal includes steps of:

providing a sixth control signal by said controller in response to said second signal; and halting dispensing additives to said water reservoir in response to said sixth control signal.

6. The method as claimed in claim 1, wherein said step of sending a first signal includes steps of:

providing hydraulic digital signals as said first signal and said second control signal; and providing electrical signals as said first control signal and said third control signal.

7. The method as claimed in claim 3, wherein said step of sending a second signal includes steps of:

providing said second signal as a hydraulic digital signal; and providing said fourth control signal as an electrical signal.

8. An apparatus for conserving utilities including coolant, in a system comprising an evaporative cooler having a water reservoir for holding a predetermined amount of cooling water and a recirculating system for recirculating said cooling water, said apparatus comprising:
- a level sensing assembly coupled to said water reservoir, said level sensing assembly for providing a first signal when a level of said cooling water is less than a first predetermined limit;
- a controller coupled to said level sensing assembly for receiving said first signal;
- a supply valve coupled to said water reservoir, to a water supply and to said controller, said supply valve operating in response to signals from said controller, said supply valve for delivering water from said water supply to said water reservoir; and
- a bleed valve coupled to said water reservoir and to said controller, said bleed valve operating in response to signals from said controller, said bleed valve for releasing an amount of water from said reservoir.

9. The apparatus as claimed in claim 8, wherein said level sensing assembly comprises:
- a still well coupled to said water reservoir by a first conduit having connection to said reservoir below a first waterline of said reservoir and coupled to said water reservoir by a second conduit having connection to said reservoir above said waterline, said still well, said first conduit and said second conduit disposed such that a second waterline is established within said still well, said second waterline closely approximating said first waterline over at least a first predetermined range of water levels;
- a float disposed in said still well such that said float maintains a level related to said second waterline over at least a second predetermined range of water levels, wherein said second predetermined range is within said first predetermined range;
- a hydraulic valve operable by said float, said hydraulic valve being a normally closed hydraulic valve; and
- a signal conduit coupled to said hydraulic valve and to said controller, said signal conduit for communicating a hydraulic digital signal "FILL" from said hydraulic valve when said hydraulic valve is opened by said float, said hydraulic valve opening and releasing water from said signal conduit when a level of said float is less than a first predetermined trip level in response to said level of said cooling water being less than said first predetermined limit.

10. The apparatus as claimed in claim 9, wherein said supply valve is coupled to said signal conduit and is operated thereby, said supply valve opening and releasing water from said water supply to said water reservoir when said level sensing assembly sends said hydraulic digital signal "FILL".

11. The apparatus as claimed in claim 8, further including an automated dispenser of chemical additives coupled to said water reservoir and to said controller, said automated dispenser operating in response to signals from said controller, said automated dispenser for automatically providing chemical additives to said water reservoir when said level sensing assembly sends said hydraulic digital signal "FILL".

12. The apparatus as claimed in claim 8, wherein:
said level sensing assembly provides a first signal "FILL" when a level of said cooling water exceeds said first predetermined limit and a second signal "DO NOT FILL" when a level of said cooling water exceeds a second predetermined limit; wherein
said bleed valve opens and releases water from said reservoir in response to said first signal "FILL" and said bleed valve closes and ceases releasing water from said reservoir in response to said second signal "DO NOT FILL"; and
said supply valve opens and delivers water from said water supply to said water reservoir in response to said first signal "FILL" and said supply valve ceases delivering water from said water supply to said water reservoir in response to said second signal "DO NOT FILL".

13. The apparatus as claimed in claim 12, further including:
an automated dispenser of chemical additives coupled to said water reservoir and to said controller, said automated dispenser operating in response to signals from said controller, said automated dispenser for automatically providing chemical additives to said water reservoir; wherein
said automated dispenser dispenses additives to said water reservoir in response to said first signal "FILL" and said automated dispenser ceases dispensing additives to said water reservoir in response to said second signal "DO NOT FILL".

14. A conservation apparatus for conserving utilities in an evaporative cooler having a water reservoir for holding a predetermined amount of cooling water, said apparatus comprising:
- a recirculating system for recirculating said cooling water;
- a level sensor coupled to said water reservoir, said level sensor providing a first signal "FILL" when a first level of said cooling water is less than a first predetermined limit and providing a second signal "FULL" when a second level of said cooling water exceeds a second predetermined limit;
- a controller coupled to said level sensor for receiving said first and second signals and relaying said first and second signals;
- a supply valve coupled to said water reservoir, to a water supply and to said controller, said supply valve operating in response to said first and second signals from said controller, said supply valve for delivering water from said water supply to said water reservoir, wherein said supply valve opens and delivers water from said water supply to said water reservoir in response to said first signal "FILL" and said supply valve ceases delivering water from said water supply to said water reservoir in response to said second signal "FULL"; and
- a bleed valve coupled to said water reservoir and to said controller, said bleed valve responsive to said first and second signals from said controller, said bleed valve for releasing an amount of water from said reservoir, wherein said bleed valve opens and releases water from said reservoir in response to said first signal "FILL" and said bleed valve closes and ceases releasing water from said reservoir in response to said second signal "FULL".

15. The conservation apparatus as claimed in claim 14, further including an automated dispenser of chemical additives coupled to said water reservoir and to said controller, said automated dispenser of chemical additives operating in response to said first and second signals from said controller, said automated dispenser of chemical additives for automatically providing chemical additives to said water reservoir, wherein said automated dispenser of chemical additives dispenses additives to said water reservoir in response to said first signal "FILL" and said automated dispenser of chemical additives ceases dispensing additives to said water reservoir in response to said second signal "FULL".

16. The conservation apparatus as claimed in claim 15, wherein said automated dispenser of chemical additives comprises:
a chemical additive reservoir; and
a pump, said pump having an inlet coupled to said chemical additive reservoir, said pump having an outlet coupled to said water reservoir, said pump operating and pumping said chemical additives from said chemical additive reservoir to said water reservoir in response to said first signal "FILL" and said pump ceasing to pump said chemical additives to said water reservoir in response to said second signal "FULL".

17. The conservation apparatus as claimed in claim 16, wherein:
said level sensor provides a first digital hydraulic signal "FILL" when a first level of said cooling water is less than a first predetermined limit and provides a second digital hydraulic signal "FULL" when a second level of said cooling water exceeds a second predetermined limit; and
said controller includes a pressure switch, said pressure switch coupled to said level sensor, said pressure switch closing an electrical circuit and providing electric power to said pump in response to said first digital hydraulic signal "FILL", said pressure switch opening an electrical circuit and ceasing to provide electric power to said pump in response to said first digital hydraulic signal "FULL".

18. The conservation apparatus as claimed in claim 14, wherein:
said supply valve comprises a hydraulically operated supply valve having a hydraulic control port coupled to said level sensor, said hydraulically operated supply valve opening and supplying water from said water supply in response to said first signal "FILL":
wherein said first signal "FILL" is a digital hydraulic signal supplied from said level sensor to said hydraulic control port;
wherein said hydraulically operated supply valve closes and ceases to supply water from said water supply in response to said second signal "FULL"; and
wherein said first signal "FULL" is a digital hydraulic signal supplied from said level sensor to said hydraulic control port.

19. The conservation apparatus as claimed in claim 14, wherein said bleed valve comprises a normally closed solenoid operated bleed valve having an electrical input, wherein said solenoid operated bleed valve opens and releases water from said reservoir in response to a first electrical signal from said controller in response to said first signal "FILL" and said bleed valve closes and ceases releasing water from said reservoir in response to a second electrical signal from said controller in response to said second signal "FULL".

20. The conservation apparatus as claimed in claim 16, wherein:
said chemical additive reservoir comprises a reservoir for containing biocidal material and said pump operates and supplies said biocidal material from said chemical additive reservoir to said water reservoir in response to said first signal "FILL"; and
said pump ceases to operate and pump said biocidal material from said chemical additive reservoir to said water reservoir in response to said second signal "FULL".

21. The conservation apparatus as claimed in claim 14, wherein said level sensor comprises:
a still well coupled to said water reservoir by a first conduit coupled to said water reservoir below a first waterline of said water reservoir and coupled to said water reservoir by a second conduit coupled to said water reservoir above said first waterline, said still well, said first conduit and said second conduit disposed such that a second waterline is established within said still well, said second waterline closely approximating said first waterline over at least a first predetermined range of water levels;
a float disposed in said still well such that said float maintains a level related to said second waterline over at least a second predetermined range of water levels, wherein said second predetermined range is within said first predetermined range;
a hydraulic valve operable by said float, said hydraulic valve being a normally closed hydraulic valve; and
a signal conduit coupled to said hydraulic valve and to said controller, said signal conduit for communicating a hydraulic digital signal "FILL" from said hydraulic valve when said hydraulic valve is opened by said float, said hydraulic valve opening and releasing water from said signal conduit when a level of said float is less than a first predetermined trip level in response to said level of said cooling water being less than a first predetermined limit, said hydraulic valve closing and blocking passage of water from said signal conduit when a level of said float is more than a second predetermined trip level in response to said level of said cooling water being more than a second predetermined limit.

22. The conservation apparatus as claimed in claim 14, wherein said level sensor comprises:
a still well coupled to said water reservoir by a first conduit coupled to said water reservoir below a first waterline of said water reservoir and coupled to said water reservoir by a second conduit coupled to said water reservoir above said first waterline, said still well, said first conduit and said second conduit disposed such that a second waterline is established within said still well, said second waterline closely approximating said first waterline over at least a first predetermined range of water levels;
a float disposed in said still well such that said float maintains a level related to said second waterline over at least a second predetermined range of water levels, wherein said second predetermined range is within said first predetermined range;
an electrical switch operable by said float; and
an electrical interconnection coupled to said electrical switch and to said controller, said electrical interconnection for communicating an electrical digital signal "FILL" from said electrical switch when said electrical switch is opened by said float when a level of said float is less than a first predetermined trip level in response to said level of said cooling water being less than a first predetermined limit, said electrical switch closing and providing an electrical digital signal "FULL" via said electrical interconnection when a level of said float is more than a second predetermined trip level in response to said level of said cooling water being more than a second predetermined limit.

23. A method for coordinating regulation and operation of a supply valve and a bleed valve, said method comprising steps of:
sending a first signal from a level sensing assembly when a cooling water level in a reservoir is less than a first predetermined limit;
receiving said first signal by a controller;
providing a first control signal from said controller in response to said first signal;
opening said bleed valve to bleed water from said reservoir in response to said first control signal;
providing a second control signal from said controller in response to said first signal; and
opening said supply valve to supply water to said reservoir in response to said second control signal.

24. The method as claimed in claim 23, further comprising steps of:
providing a third control signal from said controller in response to said first signal; and
dispensing additives from an automated dispenser to said water reservoir in response to said third control signal.

25. The method as claimed in claim 24, wherein there is further included a step of sending a second signal from said level sensing assembly when said level of said cooling water exceeds a second predetermined limit.

26. The method as claimed in claim 25, wherein said step of sending a second signal includes steps of:
receiving said second signal by said controller;
providing a fourth control signal from said controller in response to said second signal; and
closing said bleed valve to cease bleeding water from said reservoir in response to said fourth control signal.

27. The method as claimed in claim 26, wherein said step of sending a second signal includes steps of:
providing a fifth control signal by said controller in response to said second signal;
closing said supply valve to cease supplying water to said reservoir in response to said fifth control signal;
providing a sixth control signal by said controller in response to said second signal; and
halting dispensing additives to said water reservoir in response to said sixth control signal.

28. The method as claimed in claim 23, wherein said step of sending a first signal includes steps of:
providing hydraulic digital signals as said first signal and said second control signal; and
providing electrical signals as said first control signal and said third control signal.

29. The method as claimed in claim 27, wherein said step of sending a second signal includes steps of:
providing said second signal as a hydraulic digital signal; and
providing said fourth control signal as an electrical signal.

* * * * *